United States Patent Office 3,234,264
Patented Feb. 8, 1966

3,234,264
1-CYANO AND 1-CARBAMOYL-3-ALKYLBICYCLO
[1.1.0] BUTANES AND PROCESSES FOR PREPARING THE SAME
Elwood P. Blanchard, Jr., Wilmington, Del., assignor to E. I. du Pont de Nemours and Company, Wilmington, Del., a corporation of Delaware
No Drawing. Filed May 24, 1963, Ser. No. 282,867
7 Claims. (Cl. 260—464)

This invention is concerned with a new class of organic chemical compounds and a process for their preparation.

The compounds of this invention are the 1-cyano- and 1-carbamoyl-3-alkylbicyclo[1.1.0]butanes. They are prepared from the corresponding 1-cyano-3-alkylidenecyclobutanes by treatment first with hydrogen iodide to obtain a 1-cyano-3-alkyl-3-iodocyclobutane which is then treated with an alkali metal hydride to obtain a 1-cyano-3-alkyl-bicyclo[1.1.0]butane. Hydrolysis of the cyano group by treatment with alkaline hydrogen peroxide (i.e., at pH above 7) yields the corresponding 1-carbamoyl-3-alkyl-bicyclo[1.1.0]butane.

The products and process of this invention may be represented by the following equation:

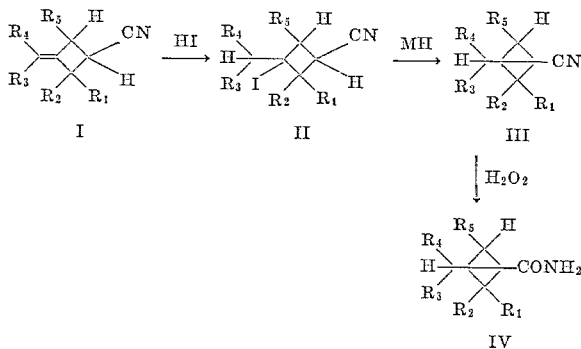

in which M is one equivalent of an alkali metal and $R_1$, $R_2$, $R_3$, $R_4$, and $R_5$ may be hydrogen or a hydrocarbyl group of 18 carbon atoms or less which is free of aliphatic carbon-to-carbon unsaturation, i.e., an alkyl group, a cycloalkyl group, an arylhydrocarbon group, an alkarylhydrocarbon group or an aralkylhydrocarbon group.

The term "hydrocarbyl," as used throughout the present specification and claims, is synonymous with the term "hydrocarbon radical." This is consistent with accepted chemical naming of organic radicals, e.g., alkyl, alkenyl, aryl, etc. Thus, the hydrocarbyl groups represented by $R_1$, $R_2$, $R_3$, $R_4$ and $R_5$ in the starting materials and products indicated above can be any radical which is aliphatically saturated, i.e., free of aliphatic carbon-to-carbon unsaturation, and which consists of hydrogen and 18 or fewer carbon atoms.

All the products of this invention may be represented generically by the formula

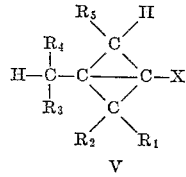

in which the R's are as defined above and X is —CN or —$CONH_2$. A preferred group are the compounds of formula V in which X is —CN. Another preferred group are the compounds of formula V in which $R_3$, $R_4$, and $R_5$ are hydrogen.

It is obvious that aliphatically saturated hydrocarbyl groups containing 12 or fewer carbon atoms, particularly those containing 6 or fewer carbon atoms, are least expensive and most available, and to that extent preferred. But there is to be no question of the operability of, or of the intent to include and disclose, any hydrocarbyl group whatsoever as long as it is free of aliphatic carbon-to-carbon unsaturation and contains 18 or fewer carbon atoms.

In the first step of the process of this invention, a 1-cyano-3-alkylidenecyclobutane is brought into intimate contact with hydrogen iodide. Molar proportions of cyclobutane/iodide may be from 1/10 to 10/1. The hydrogen iodide may be employed in the form of the anhydrous gas or, more conveniently, in the form of an aqueous solution, preferably one containing between about 10% and about 60% hydrogen iodide by weight. All that is required for the reaction to take place is that the reactants be brought into intimate contact. This may be accomplished by simple agitation, using means well known in the art. Temperatures and pressures above and below room temperature and pressure are operable. For example, temperatures in the range from 0–200° C. may be used. However, room temperature and pressure are entirely satisfactory. No added catalysts or ingredients are necessary. The resulting 1-cyano-3-iodo-3-alkylcyclobutane may be separated from the reaction mixture by extraction with an organic solvent, such as methylene chloride, which is inert to the reactants and products, followed by evaporation of the solvent. The product may be purified by distillation.

In the second step of the process of this invention, a 1-cyano-3-iodo-3-alkylcyclobutane is brought into intimate contact with an alkali metal hydride. Molar proportions of cyclobutane/metal hydride may be from 1/10 to 10/1. Suitable metal hydrides include those of lithium, sodium, potassium, rubidium, and cesium. The metal hydride may be employed as such, suitably in powdered form, or it may be suspended in an inert medium, such as a saturated hydrocarbon oil. As in the first step noted above, intimate contact in the second step may be obtained by simple agitation. Temperatures and pressures above and below room temperature and pressure are operable. For example, temperatures in the range of 0–100° C. may be used. However, room temperature and pressure are entirely saisfactory. Improved yield of product in this reaction is sometimes obtained by moderate heating in the range of 30–60° C. at the end of the reaction time. The resulting 1-cyano-3-alkylbicyclo-[1.1.0]butane may be separated from the reaction mixture by extraction with an organic solvent, such as diethyl ether, which is inert to the reactants and products. The product may be purified by distillation.

The 1-cyano-3-alkylbicyclo[1.1.0]butanes of Formula V are all useful for preparing the corresponding polymerizable butadienes by pyrolysis according to the equation:

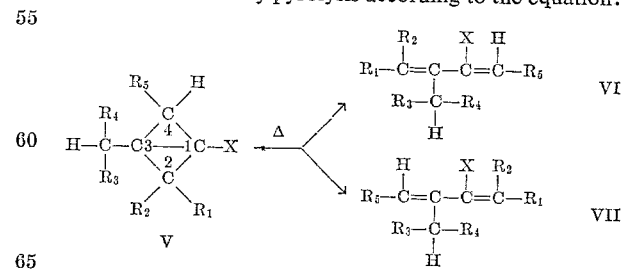

Pyrolysis temperatures in the range of 200–500° C. may be employed and it is preferred to operate at pressures below atmospheric pressure, particularly at 0.1 atmosphere and below. In the pyrolysis the bicyclobutane ring is opened in two ways: at bonds 1,2- and 3,4- to give rise to the butadiene of Formula VI, or at bonds 2,3- and 4,1- to give rise to the butadiene of Formula VII. The resulting mixture of butadienes can be readily separated into two components by chromatography, distillation, fractional crystallization, and other means well known in the art. It is evident that when $R_1$ and $R_5$ are the same and $R_2$ is hydrogen, the compounds of Formulas VI and VII are identical, and only a single butadiene will be obtained in the pyrolysis. This type of situation is illustrated in Example V.

The butadienes obtained from the pyrolysis discussed above can be polymerized alone or, if preferred, from mixtures containing other lower molecular weight butadienes.

The 1-cyano-3-alkylidenecyclobutane starting materials for use in this invention are prepared as shown in U.S. Patent 2,914,541 by reaction of an allene with a 1-cyano-1H-olefin. This may be illustrated by the equations:

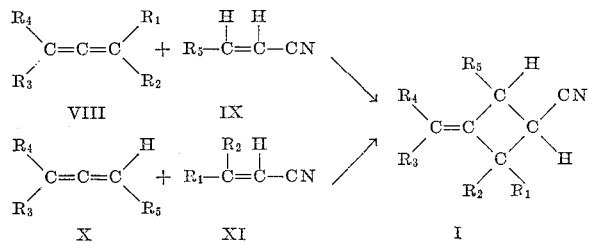

in which the R's are as defined above.

Illustrative hydrocarbyl groups included within the present invention are alkyl groups such as methyl, ethyl, tertiary butyl, hexyl, isooctyl, dodecyl, octadecyl, and the like; cycloalkyl groups such as cyclopropyl, cyclobutyl, cyclopentyl, cyclohexyl, cyclooctyl, methylcyclohexyl, 3,5-dicyclohexylcyclohexyl, cyclooctadecyl, and the like; aryl groups such as phenyl, naphthyl, anthryl, p-biphenylyl, p,p'-triphenylyl, naphthacenyl, benzanthryl, chrysenyl, and the like; alkaryl groups such as p-tolyl, p-cumenyl, 2,4,6-tributylphenyl, 9,10-diethyl-1-anthryl, 6-methyl-2-naphthyl, and the like; and aralkyl groups such as benzyl, phenethyl, diphenylmethyl, α-naphthylethyl, 2-(2-anthryl)ethyl, 4-(2-anthryl)butyl, and the like.

Thus, representative compounds included within the present invention are those shown in column E of Table I below.

In the following examples, parts are by weight unless otherwise noted. Examples II, IV, and V illustrate the preferred embodiments.

EXAMPLE I

*Part A.*—To 90 parts of 55–58% hydriodic acid is added with stirring 18.6 parts of 3-methylenecyclobutanecarbonitrile. The mixture is stirred for one-half hour and then the lower layer separated, diluted with ether and dried over magnesium sulfate. Filtration followed by distillation gives 22.2 parts of 3-iodo-3-methylcyclobutanecarbonitrile, B.P. 62–66° C./1 mm.

*Part B.*—To a stirred slurry of 2.12 parts of 56% by weight sodium hydride mineral oil dispersion in 35.5 parts of diethyl ether is added 11.05 parts of 3-iodo-3-methylcyclobutanecarbonitrile. The mixture is heated at reflux with stirring for 64 hours, cooled to about 0° C., then four parts of methanol followed by 30 parts of water added. The ether phase is separated, dried over magnesium sulfate and distilled to give three parts of 1-cyano-3-methylbicyclo[1.1.0]butane, B.P. 66–67° C./32 mm.

*Analysis.*—Calcd. for $C_6H_7N$: C, 77.38; H, 7.58; N, 15.04; M.W., 93. Found: C, 77.01; H, 7.51; N, 15.22; M.W., 91.

EXAMPLE II

*Part A.*—To 900 parts 55–58% hydriodic acid is added with stirring 186 parts of 3-methylenecyclobutanecarbonitrile. After 16 hours the lower phase is separated and the aqueous phase extracted twice with 200 parts of methylene chloride. The combined organic phase is dried over anhydrous magnesium sulfate, filtered and distilled to give 315 parts of 3-iodo-3-methylcyclobutanecarbonitrile, B.P. 68–70° C. at 1 mm. Hg, and having $n_D^{25}$ 1.5411.

*Analysis.*—Calcd. for $C_6H_8IN$: C, 32.6; H, 3.6; N, 6.3; I, 57.5. Found: C, 33.9; H, 3.8; N, 6.5; I, 54.5.

*Part B.*—To a stirred slurry of 78 parts 56% (by weight) sodium hydride-mineral oil dispersion in 1015 parts of diethyl ether is added 315 parts of 3-iodo-3-methylcyclobutanecarbonitrile. After 72 hours the mixture is heated at reflux for 0.5 hour. It is then cooled in an ice water bath, 115 parts of methanol added in small portions, and then 870 parts of water added. The upper phase is separated and the lower aqueous phase extracted twice with 175 parts of diethyl ether. The combined ether phase is dried over anhydrous magnesium sulfate, filtered and the filtrate distilled to give 115 parts of 1-cyano-3-methylbicyclo[1.1.0]butane, B.P. 58–60° C., at 22 mm. Hg with $n_D^{25}$ 1.4521.

EXAMPLE III

*Part A.*—To 90 parts of 55–58% hydriodic acid is added with stirring 24.2 parts of 2,2-dimethyl-3-methylenecyclobutanecarbonitrile. After 14 hours the lower phase is separated and the upper aqueous phase extracted with 34 parts of methylene chloride. The combined organic phase is extracted with 50 parts of water and 50 parts sodium thiosulfate solution. The organic phase is dried over anhydrous magnesium sulfate, filtered and distilled to give 33.3 parts of 2,2,3-trimethyl-3-iodocyclobutanecarbonitrile, B.P. 81–83° C. at 1 mm. which crystallizes on cooling to room temperature.

*Part B.*—To a stirred slurry of 7.25 parts of 56.5% sodium hydride in mineral oil dispersion in 105 parts of diethyl ether is added 33.3 parts 2,2,3-trimethyl-3-iodocyclobutanecarbonitrile. After 16 hours, the mixture is heated to reflux and then cooled in an ice water bath. Twelve parts of methanol and 100 parts water are added. The upper ether phase is separated and the lower aqueous phase extracted twice with 35 parts of diethyl ether. The combined ether phase is dried over anhydrous magnesium sulfate, filtered and the filtrate distilled to give 9.9 parts of 2,2,3-trimethyl-1-cyanobicyclo[1.1.0]butane, B.P. 82–84° C. at 27 mm. Hg.

*Analysis.*—Calcd. for $C_8H_{11}N$: C, 79.3; H, 9.1; N, 11.6. Found: C, 79.3; H, 9.5; N, 11.8.

EXAMPLE IV

A stirred solution of 93 parts of 1-cyano-3-methylbicyclo[1.1.0]butane in about 395 parts of ethanol and 445 parts of 30% aqueous hydrogen peroxide is cooled to 0° C. About 44 parts of 6 N aqueous sodium hydroxide is added. The solution is stirred at 0° C. for one hour and then warmed to 50–60° C. for two hours. Ethanol is evaporated at reduced pressure, and the aqueous phase is extracted with three 1126-part portions of ethyl acetate, followed by two 1126-part portions of hot ethyl acetate. The extracts are combined, dried over magnesium sulfate, filtered, and the filtrate concentrated by evaporation at reduced pressure. The colorless, crystalline residue is recrystallized from ethyl acetate to give 74 parts (66% yield) of 1-carbamoyl-3-methylbicyclo[1.1.0]butane in the form of colorless plates melting with decomposition at 144–144.5° C. A sample for analysis is purified by sublimation at 100° C. and 1 mm. pressure.

*Analysis.*—Calcd. for $C_6H_9NO$: C, 64.80; H, 8.11; N, 12.61. Found: C, 64.44, 64.40; H, 7.89, 8.11; N, 12.33, 12.41.

EXAMPLE V 1-cyano-3-methylbicyclo[1.1.0]butane (105 parts) is pyrolyzed by passage of its vapors through a 14 x 200 mm. pyrolysis tube coated with elemental silicon and packed with 60–100 mesh silicon chips. The pyrolysis tube is heated at 350±5° C. and the pressure held at 1 mm. The pyrolysate is collected in a trap cooled at −78° C. to obtain 103 parts of 2-cyano-3-methyl-1,3-butadiene, $n_D^{25}$ 1.4618, which is greater than 95% pure as determined by gas liquid chromatography.

When 1-carbamoyl-3-methylbicyclo[1.1.0]butane is pyrolyzed according to the procedure of Example V, 2-carbamoyl-3-methyl-1,3-butadiene is obtained.

When the allenes (A) and acrylonitriles (B) indicated in Table I below are substituted for the allene and acrylonitrile in the procedure of Example I of U.S. Patent 2,914,541, the indicated 1-cyano-3-alkylidenecyclobutane (C) can be obtained. When this compound in turn is substituted for 1-cyano-3-methylenecyclobutane and treated with hydrogen iodide according to the procedure of Part A in Example II of the present application, the indicated 1-cyano-3-alkyl-3-iodocyclobutane (D) is obtained. This in turn, when treated with an alkali metal hydride according to the procedure of Part B, yields the indicated 1-cyano-3-alkylbicyclo[1.1.0]butane (E). The latter compound is converted to the corresponding 1-carbamoyl derivative by treatment with alkaline hydrogen peroxide according to the procedure of Example IV. The product (E) when pyrolyzed according to the procedure of Example V yields the indicated cyano-substituted butadienes (F). Pyrolysis of the carbamoyl derivatives yields the corresponding carbamoyl-substituted butadienes.

*Table I*

| Item | A. Allene | B. Acrylonitrile | C. 1-Cyano-3-alkylenecyclobutane | D. 1-Cyano-3-alkyl-3-iodocyclobutane |
|---|---|---|---|---|
| 1 | 1-phenylallene | acrylonitrile | 1-cyano-3-methylene-2-phenylcyclobutane. | 1-cyano-3-iodo-3-methyl-2-phenylcyclobutane. |
| 2 | 1,1-diethylallene | acrylonitrile | 1-cyano-2,2-diethyl-3-methylenecyclobutane. | 1-cyano-2,2-diethyl-3-iodo-3-methylcyclobutane. |
| 3 | 1,1-dimethylallene | acrylonitrile | 1-cyano-3-isopropylidenecyclobutane. | 1-cyano-3-iodo-3-isopropylcyclobutane. |
| 4 | 1,1-di-n-butylallene | β-methylacrylonitrile | 1-cyano-2,2-di(n-butyl)-4-methyl-3-methylenecyclobutane. | 1-cyano-2,2-di(n-butyl)-3-iodo-3,4-dimethylcyclobutane. |
| 5 | 1,1-di-n-butylallene | β-methylacrylonitrile | 1-cyano-2-methyl-3-(5-nonylidene)-cyclobutane*. | 1-cyano-3-iodo-2-methyl-3-(5-nonyl)-cyclobutane. |
| 6 | 1-n-dodecylallene | β-phenylacrylonitrile | 1-cyano-2-dodecyl-3-methylene-4-phenylcyclobutane. | 1-cyano-2-dodecyl-3-iodo-3-methyl-4-phenylcyclobutane. |
| 7 | 1-n-dodecylallene | β-phenylacrylonitrile | 1-cyano-2-phenyl-3-tridecylidene-cyclobutane*. | 1-cyano-3-iodo-2-phenyl-3-tridecylcyclobutane. |
| 8 | 1,1-di-n-octylallene | β-n-butyl-β-methylacrylonitrile | 2-n-butyl-1-cyano-3-(9-heptadecylidene)-2-methylcyclobutane. | 2-n-butyl-1-cyano-3-(9-heptadecyl)-3-iodo-2-methylcyclobutane. |
| 9 | tetramethylallene | β-decylacrylonitrile | 1-cyano-4-decyl-3-isopropylidene-2,2-dimethylcyclobutane. | 1-cyano-4-decyl-3-iodo-3-isopropyl-2,2-dimethylcyclobutane. |
| 10 | 1-cyclohexylallene | β-cyclopropyl-β-methylacrylonitrile. | 1-cyano-4-cyclohexyl-2-cyclopropyl-2-methyl-3-methylenecyclobutane. | 1-cyano-4-cyclohexyl-2-cyclopropyl-3-iodo-2,3-dimethylcyclobutane. |
| 11 | 1-cyanohexylallene | β-cyclopropyl-β-methylacrylonitrile. | 1-cyano-3-cyclohexylmethylene-2-cyclopropyl-2-methylcyclobutane*. | 1-cyano-3-cyclohexylmethyl-2-cyclopropyl-3-iodo-2-methylcyclobutane. |
| 12 | 1-tridecylallene | β-benzyl-β-methylacrylonitrile. | 2-benzyl-1-cyano-2-methyl-3-methylene-4-tridecylcyclobutane. | 2-benzyl-1-cyano-3-iodo-2,3-dimethyl-4-tridecylcyclobutane. |
| 13 | 1-tridecylallene | β-benzyl-β-methylacrylonitrile. | 2-benzyl-1-cyano-2-methyl-3-tetradecylidene. | 2-benzyl-1-cyano-3-iodo-2-methyl-3-tetradecylcyclobutane. |
| 14 | allene | β,β-diphenylacrylonitrile | 1-cyano-3-methylene-2,2-diphenylcyclobutane. | 1-cyano-3-iodo-3-methyl-2,2-diphenylcyclobutane. |
| 15 | allene | β-(β-naphthyl)-acrylonitrile | 1-cyano-3-methylene-2-(β-naphthyl)cyclobutane. | 1-cyano-3-iodo-3-methyl-2-(β-naphthyl)-cyclobutane. |
| 16 | 1-(α-naphthyl)-1,3-diphenyl-3-p-tolylallene. | acrylonitrile | 1-cyano-2-(α-naphthyl)-2-phenyl-3-(1-phenyl-1-p-tolyl)methylenecyclobutane. | 1-cyano-3-iodo-2-(α-naphthyl)-2-phenyl-3-(1-phenyl-1-p-tolyl)-methylcyclobutane. |
| 17 | 1-cyclohexylmethylallene | acrylonitrile | 1-cyano-3-(β-cyclohexylethylidene)cyclobutane. | 1-cyano-3-(β-cyclohexylethyl)-3-iodocyclobutane. |
| 18 | 1-cyclohexylmethylallene | acrylonitrile | 1-cyano-2-cyclohexylmethyl-3-methylenecyclobutane*. | 1-cyano-2-cyclohexylmethyl-3-iodo-3-methylcyclobutane. |

| Item | E. 1-Cyano-3-alkylbicyclo[1.1.0]butane | F. Butadienes Obtained by Pyrolysis of Product E | |
|---|---|---|---|
| 1 | 1-cyano-3-methyl-2-phenylbicyclo[1.1.0]butane. | 3-cyano-2-methyl-1-phenyl-1,3-butadiene | 2-cyano-3-methyl-1-phenyl-1,3-butadiene. |
| 2 | 1-cyano-2,2-diethyl-3-methylbicyclo-[1.1.0]butane. | 2-cyano-4-ethyl-3-methyl-1,3-hexadiene | 3-cyano-4-ethyl-2-methyl-1,3-hexadiene. |
| 3 | 1-cyano-3-isopropylbicyclo[1.1.0]butane. | 2-cyano-3-isopropyl-1,3-butadiene | |
| 4 | 1-cyano-2,2-di(n-butyl)-3,4-dimethylbicyclo[1.1.0]butane. | 3-cyano-5-n-butyl-4-methyl-2,4-nonadiene | 4-cyano-5-n-butyl-3-methyl-2,4-nonadiene. |
| 5 | 1-cyano-2-methyl-3-(5-nonyl)bicyclo-[1.1.0]butane. | 2-cyano-3-(5-nonyl)-1,3-pentadiene | 3-cyano-2-(5-nonyl)-1,3-pentadiene. |
| 6 | 1-cyano-2-dodecyl-3-methyl-4-phenylbicyclo[1.1.0]butane. | 2-cyano-3-methyl-1-phenyl-1,3-hexadecadiene. | 3-cyano-2-methyl-1-phenyl-1,3-hexadecadiene. |
| 7 | 1-cyano-2-phenyl-3-tridecylbicyclo[1.1.0]butane. | 3-cyano-1-phenyl-2-tridecyl-1,3-butadiene | 2-cyano-1-phenyl-3-tridecyl-1,3-butadiene. |
| 8 | 2-n-butyl-1-cyano-3-(9-heptadecyl)-2-methylbicyclo[1.1.0]butane. | 2-cyano-3-(9-heptadecyl)-4-methyl-1,3-octadiene. | 3-cyano-2-(9-heptadecyl)-4-methyl-1,3-octadiene. |
| 9 | 1-cyano-4-decyl-3-isopropyl-2,2-dimethylbicyclo[1.1.0]butane. | 4-cyano-3-isopropyl-1-methyl-2,4-pentadecadiene. | 3-cyano-4-isopropyl-1-methyl-2,4-pentadecadiene. |
| 10 | 1-cyano-4-cyclohexyl-2-cyclopropyl-2,3-dimethylbicyclo[1.1.0]butane. | 2-cyano-1-cyclohexyl-4-cyclopropyl-3-methyl-1,3-pentadiene. | 3-cyano-1-cyclohexyl-4-cyclopropyl-2-methyl-1,3-pentadiene. |
| 11 | 1-cyano-3-cyclohexylmethyl-2-cyclopropyl-2-methylbicyclo[1.1.0]butane. | 2-cyano-3-cyclohexylmethyl-4-cyclopropyl-1,3-pentadiene. | 3-cyano-2-cyclohexylmethyl-4-cyclopropyl-1,3-pentadiene. |
| 12 | 2-benzyl-1-cyano-2,3-dimethyl-4-tridecylbicyclo[1.1.0]butane. | 2-benzyl-4-cyano-3-methyl-2,4-octadecadiene. | 2-benzyl-3-cyano-4-methyl-2,4-octadecadiene. |
| 13 | 2-benzyl-1-cyano-2-methyl-3-tetradecylbicyclo[1.1.0]butane. | 4-benzyl-2-cyano-3-tetradecyl-1,3-pentadiene. | 4-benzyl-3-cyano-2-tetradecyl-1,3-pentadiene. |
| 14 | 1-cyano-3-methyl-2,2-diphenylbicyclo[1.1.0]butane. | 3-cyano-2-methyl-1,1-diphenyl-1,3-butadiene. | 2-cyano-3-methyl-1,1-diphenyl-1,3-butadiene. |
| 15 | 1-cyano-3-methyl-2-(β-naphthyl)bicyclo[1.1.0]butane. | 3-cyano-2-methyl-1-(β-naphthyl)-1,3-butadiene. | 2-cyano-3-methyl-1-(β-naphthyl)-1,3-butadiene. |
| 16 | 1-cyano-2-(α-naphthyl)-2-phenyl-3-(1-phenyl-1-p-tolyl)methylbicyclo[1.1.0]butane. | 3-cyano-1-(α-naphthyl)-1-phenyl-2-(1-phenyl-1-p-tolyl)methyl-1,3-butadiene. | 2-cyano-1-(α-naphthyl)-1-phenyl-3-(1-phenyl-1-p-tolyl)methyl-1,3-butadiene. |
| 17 | 1-cyano-3-(β-cyclohexylethyl)bicyclo[1.1.0]butane. | 2-cyano-3-(β-cyclohexylethyl)-1,3-butadiene | |
| 18 | 1-cyano-2-cyclo-2-cyclohexylmethyl-3-methylbicyclo[1.1.0]butane. | 3-cyano-5-cyclohexyl-2-methyl-1,3-pentadiene. | 2-cyano-5-cyclohexyl-3-methyl-1,3-pentadiene. |

*Separated from product in item above in the manner shown in Example XV of U.S. 2,914,541.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

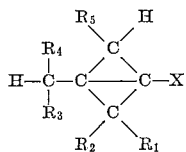

wherein X is selected from the class consisting of —CN and —CONH$_2$ and R$_1$, R$_2$, R$_3$, R$_4$ and R$_5$ each is selected from the group consisting of hydrogen and hydrocarbyl radicals free of aliphatic carbon-to-carbon unsaturation and containing from 1–18 carbon atoms.

2. A compound of the formula

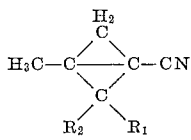

wherein R$_1$ and R$_2$ each represents a hydrocarbyl radical free of aliphatic carbon-to-carbon unsaturation and containing from 1–18 carbon atoms.

3. A compound of the formula

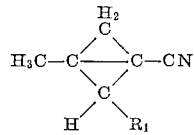

wherein R$_1$ represents a hydrocarbon radical free of aliphatic carbon-to-carbon unsaturation and containing from 1–18 carbon atoms.

4. 1-cyano-3-methylbicyclo[1.1.0]butane.
5. 2,2,3-trimethyl-1-cyanobicyclo[1.1.0]butane.
6. 1-carbamoyl-3-methylbicyclo[1.1.0]butane.
7. Process which comprises (I) contacting and reacting, at a temperature in the range 0° C. to 200° C., a 1-cyano-3-alkylidenecyclobutane wherein R$_1$, R$_2$, R$_3$, R$_4$ and R$_5$ each is selected from the group consisting of hydrogen and hydrocarbyl radicals free of aliphatic carbon-to-carbon unsaturation and containing 1 to 18 carbon atoms with an aqueous solution containing from 10% to 60% hydrogen iodide by weight, (II) isolating the resultant 1-cyano-3-iodo-3-alkylcyclobutane, (III) contacting and reacting, at a temperature in the range 0° C. to 100° C., said iodo-alkylcyclobutane with an alkali metal hydride and (IV) recovering the resultant 1-cyano-3-alkylbicyclo[1.1.0]butane, the molar proportions of reactants in each of steps (I) and (III) being in the range 1:10 to 10:1.

No references cited.

CHARLES B. PARKER, *Primary Examiner.*